Sept. 1, 1964 R. ADLER 3,147,441

PHASE MODULATION RECEIVER CONTAINING A PARAMETRIC AMPLIFIER

Filed May 26, 1961

INVENTOR
Robert Adler

BY Hugh H. Drake
ATTORNEY 3,147,441

PHASE MODULATION RECEIVER CONTAINING A PARAMETRIC AMPLIFIER

Robert Adler, Northfield, Ill., assignor to Zenith Radio Corporation, a corporation of Delaware Filed May 26, 1961, Ser. No. 112,803
17 Claims. (Cl. 325—485)

Figures 1, 2, 3, 4:
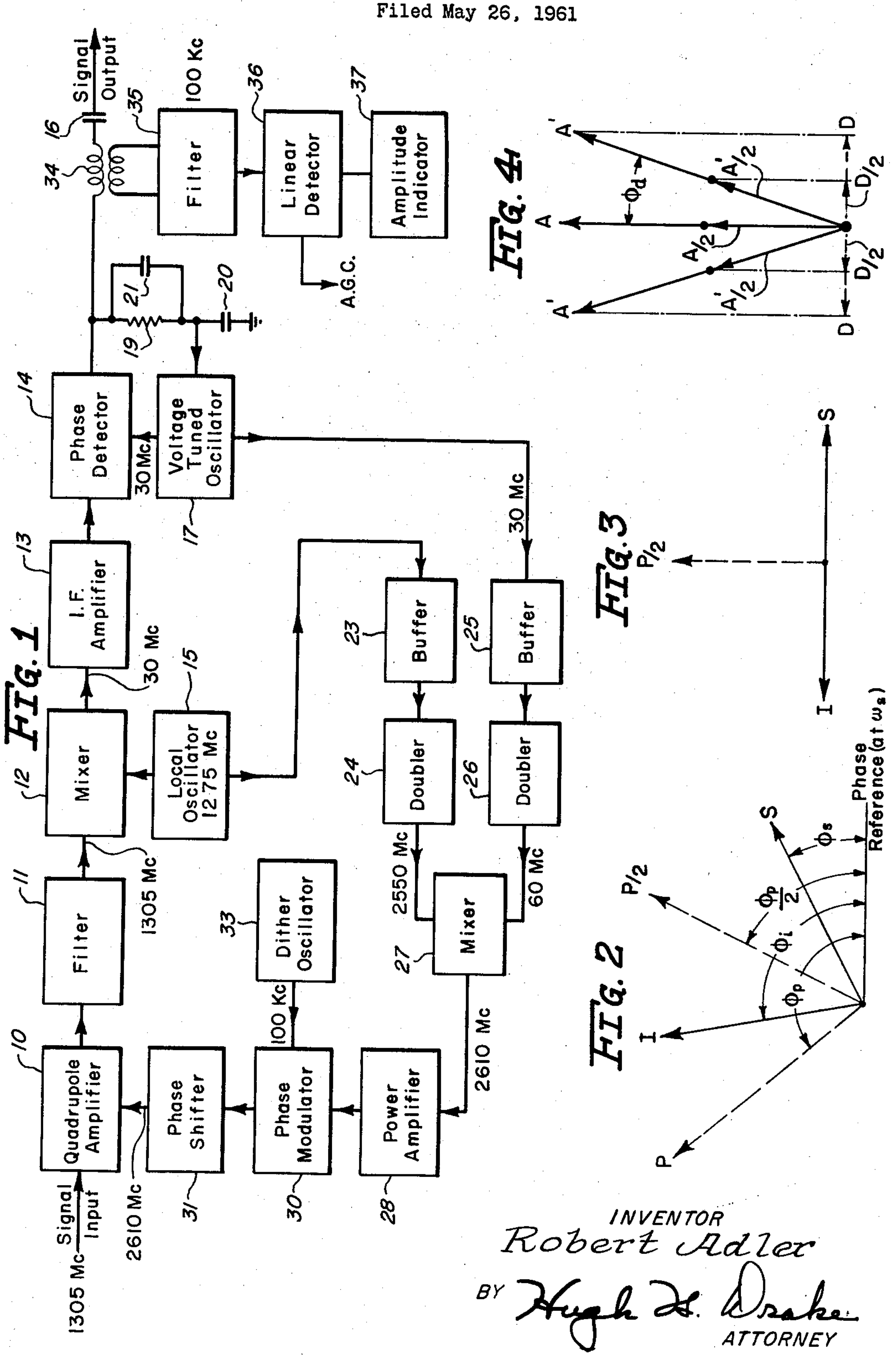

This inventon relates to wave signal receiving systems of a kind responsive to intelligence represented by changes in phase or frequency of components of the wave signal. It has particular applicability to systems of this type in which it is desired that receiver operation be maintained in synchronism with received signal components by means of a frequency or phase lock arrangement.

The development of the parametric amplifier has led to the attainment of very low noise figures in high frequency receiving systems. It has been advantageously used for space, missile, and general communications and detection purposes. In certain applications parametric amplifiers find unique applicability by reason of their phase-sensitivity. However, the same properties which are advantageous have given rise to particular problems and have presented several operational disadvantages.

It is accordingly a general object of the present invention to provide a wave signal receiving system which overcomes the aforenoted problems and disadvantages.

It is also an objective of the present invention to provide improvements of the foregoing nature which are applicable generally to various different receiver systems in which similar problems and disadvantages are found.

A further object of the invention is to obtain synchronous operation of a parametric amplifier in a phase-lock receiver.

It is a particular object of the present invention to provide a parametric amplifier system sensitive to phase or frequency mode information and which also responds to amplitude information.

Another specific object of the present invention is to provide a parametric amplifier system in which the amplifier is synchronously pumped and which avoids the development in the local pump source signal energy at the frequency of the input signal.

Apparatus according to one aspect of the invention is capable of receiving wave signals having a carrier phase modulated with intelligence and of predetermined nominal frequency. The apparatus includes phase sensitive receiving means having a predetermined intelligence signal passband and responsive to the wave signals for detecting the intelligence while suppressing the carrier. To make possible the detection of amplitude information, additional signal energy within the passband is impressed upon the receiving means. The receiver further includes amplitude sensitive means coupled to the output of the receiving means and responsive to the additional signal energy for developing a control signal indicative of the amplitude of the carrier.

In accordance with a further aspect of the present invention, the wave-signal receiver includes a parametric amplifier responsive to the wave signals together with phase-senstitive means for amplifying and detecting the intelligence while suppressing the carrier and for developing a signal indicative of drift in the average phase of the wave signal. The apparatus also includes means for developing and supplying to the amplifier a pump signal having a frequency twice the frequency of the received wave signal and responsive to the drift indicative signal for maintaining the half-pump phase of the pump signal constant with respect to the average phase of the received wave signal.

In another aspect the invention pertains to a parametric amplifier system including first and second sources of signals having individual frequencies algebraically additive to substantially equal the predetermined frequency of the received wave signals. The apparatus includes separate means for doubling the frequency of each of the signals from the two sources together with means for combining the doubled signals to develop for the parametric amplifier a pump signal which has a frequency twice that of the instantaneous carrier frequency of the wave signals.

The features of the present invention which are believed to be novel are set forth with particularity in the appended claims. The organization and manner of operation of the invention, together with further objects and advantages thereof, may best be understood by reference to the following description taken in conjunction with the accompanying drawings, in which:

FIGURE 1 is a schematic block diagram of apparatus constructed in accordance with the present invention; and FIGURES 2, 3 and 4 are vector diagrams useful in understanding the operation of the apparatus depicted in FIGURE 1.

For purposes of illustration, the invention is embodied in FIGURE 1 as a phase-lock receiver using a quadrupole type electron beam parametric amplifier. While this receiver is specifically designed to detect intelligence appearing upon a carrier as a phase modulation, the principles are equally applicable to modulation of either phase or frequency and therefore find advantageous employment in connection with frequency modulation, phase modulation, and frequency shift receiving systems. Accordingly, the terms "phase-senstitive," "phase-modulated" and the like as utilized in the present specification and claims are defined to include frequency-sensitive and other equivalent modulation modes and apparatus therefor.

Quadrupole amplifier 10 is of the kind described and claimed in the co-pending application by Glen Wade for Parametric Amplifier, Serial No. 747,764, filed July 10, 1958, and assigned to the same assignee as the present application. This specific amplifier is also described and explained in detail in an article by Robert Adler et al. and entitled "A Low-Noise Electron-Beam Parametric Amplifier," which appeared in the proceedings of the IRE, volume 46, No. 10, for October 1958. For ease of understanding, the system of FIGURE 1 has been illustrated with respect to reception of a wave signal having a nominal carrier frequency of 1305 megacycles (mc.) on which the phase modulated intelligence appears. This signal, which may be intercepted by a suitable antenna, is applied to the input of quadrupole amplifier 10.

The primary intelligence signal channel in the receiver extends through amplifier 10, a filter 11, a mixer 12, an IF amplifier 13, and a phase detector 14. Filter 11 has a passband to accommodate the input signal carrier and its modulation. Mixer 12 serves as a first detector and is supplied with a heterodyning signal from a local oscillator 15. For the assumed 1305 mc. input signal, local oscillator 15 develops a signal at 1275 mc. so that mixer 12 transposes the input signal to a 30 mc. IF frequency which is amplified in amplifier 13. The intermediate frequency signal is applied to phase detector 14 from which the demodulated signal intelligence is fed to an output transducer over a capacitor 16. Detector 14 is operated synchronously, utilizing a 30 mc. voltage-tuned oscillator 17. The signals from oscillator 17 are maintained in synchronism with the IF frequency signals under the control of a feedback loop which includes an antihunt network composed of a series resistor 19, a capacitor 30 shunting the input terminals of oscillator 17, and a capacitor 21 shunting resistor 19.

Because the quadrupole amplifier in the phase lock receiver is desired to be operated in the degenerate mode, the pump signal for amplifier 10 is of a frequency twice the instantaneous carrier frequency of the received signal. To synchronously develop the pump signal, the signals from local oscillator 15 and voltage-tuned oscillator 17 are first doubled separately and then combined. This avoids production in the local pump source of a signal frequency the same as that of the input signal, as would occur if the signals from oscillators 15 and 17 simply were first combined and then doubled. In this instance, the signal from oscillator 15 is applied through a buffer amplifier 23 to a frequency doubler 24. Similarly, the signal from oscillator 17 is applied through a buffer amplifier 25 to a frequency doubler 26. The two signals from doublers 24, 26 are then added in a mixer 27 from the output of which a signal of the desired pump frequency, in this instance 2610 mc., is obtained. The pump signal is then amplified in a power amplifier 28 from which it is fed to amplifier 10 through a phase modulator 30 and a phase shifter 31. Phase shifter 31 is included for convenience in adjusting the phase of the pump signal to exactly that value needed to ensure optimum operation.

Completing the physical components present in the illustrative embodiment is a dither oscillator 33, the output of which is modulated onto the pump signal by modulator 30, and an output network responsive to the signal energy from dither oscillator 33. This output network includes a takeoff transformer 34 coupled to the output circuit of phase detector 14, a filter 35 having a passband to accommodate the dither signal, a linear detector 36, and amplitude-sensitive output means such as an amplitude indicator 37 or an AGC network as indicated in FIGURE 1. Before discussing the function of elements 33–37, the basic mode of operation of the receiver under consideration will be explained.

The operation of parametric amplifier 10 may be approximately characterized as providing, in addition to the amplified signal, an equal-amplitude idler signal which is generated by the amplification process. The phase angle of the idler signal may be represented as follows:

$$(\omega_i t+\phi_i)=(\omega_p t+\phi_p)-(\omega_s t+\phi_s)$$

where $\omega_i$ is the idler signal frequency, $\phi_i$ is the idler signal phase (relative to a selected phase reference at the input signal frequency), $\omega_p$ is the pump frequency with $\phi_p$ being the pump signal phase, and $\omega_s$ represents the input signal frequency with $\phi_s$ representing the input signal phase.

For the case in which the pump signal frequency is exactly twice the input signal frequency, the phase angle relationships are stationary in time as depicted in FIGURE 2. The vectors I and S represent the idler and input signal phase vectors, respectively, while vector P indicates the phase of the pump signal. The phase vector labelled $P/2$ is representative of the so-called half-pump phase and serves to correlate the resulting phase relationships while accounting for the 2 to 1 frequency relationship between the pump and input signals.

During operation of amplifier 10, phase vectors S and I are always disposed symmetrically about the half-pump phase vector. The output of the synchronously-pumped parametric amplifier is the resultant of the signal and idler vectors; its phase always equals that of the half-pump phase vector. Consequently, parametric amplifier 10 suppresses signal components which are in quadrature to the half-pump phase and amplifies those signal components which are in phase with the half-pump vector. When the system is in use to receive a phase modulated signal, phase shifter 31 is varied to adjust the half-pump phase such that it is in quadrature to the average received carrier phase; this condition is illustrated in FIGURE 3, wherein the average signal carrier phase vector S is in quadrature to the half-pump phase vector $P/2$ and the idler signal phase vector I is symmetrically oriented with respect to the vector $P/2$ from vector S. Any phase variations of the received carrier (vector S), due to phase modulation, frequency modulation or doppler shift, produce an output signal component having a phase lying along the half pump vector. However, the average carrier represented by vector S does not appear in the amplifier output. As a result, the output signal from phase detector 14 includes the original phase modulation with the carrier suppressed.

Any drift in the average phase of the received signal carrier which is slow compared to the rate of change of intelligence modulation produces a unidirectional signal in the output circuit of phase detector 14. This unidirectional drift-indicative signal is utilized to control the frequency of oscillator 17 and thereby phase-lock the oscillator signal to the average phase of the received signal carrier.

Since the signal from oscillator 17 is phase-locked to the received signal, the pump signal which is in part developed from and is controlled in phase by the signal from oscillator 17 also is phase-locked with respect to the received signal. Consequently, the quadrature relationship indicated in FIGURE 3 is maintained. The receiver then is said to be phase-locked to the received signal and parametric amplifier 10 is operated synchronously in its degenerate mode.

Because in the mode of operation just described the carrier signal is suppressed and does not appear in the output, information pertaining to relative or absolute signal strength is lost. This inherent disadvantage of the system precludes direct development of a signal useful for automatic gain control or otherwise to supply information to an amplitude monitor. To overcome this deficiency of the system, the apparatus includes means for impressing upon the received-signal channel an indicating or dither signal having a frequency within the intelligence signal passband of the receiving means. In the present embodiment, this takes the form of phase modulator 30 and dither oscillator 33. The frequency of the signal from the latter source is preferably, but not necessarily, outside the frequency range of the desired input signal modulation; in the illustrated example, the frequency of the signal from oscillator 33 is 100 kilocycles (kc.). Although the dither signal frequency may as well be phase-modulated upon the input signal, it is preferred to modulate the pump signal in the manner shown.

The purpose of the signal from oscillator 33 is to purposely cause a deviation of the input signal carrier at a rate within the intelligence signal passband of the amplifying channel. This effect is illustrated in FIGURE 4 in which the average received carrier is indicated by vector A. Under the influence of the modulation from oscillator 33, the vector, which actually denotes the resultant of signal and idler, swings to either side of its average phase by an angle $\phi_d$ which is a function of the amplitude of the dither signal from oscillator 33. Phase vectors representative of the maximum extent of this deviation are labelled A′ in FIGURE 4.

The phase deviation caused by the signal from oscillator 33 results in the development of a signal component (vector D) in phase quadrature to the average carrier phase depicted by vector A. As noted previously, the average carrier is in quadrature to the half-pump phase and is suppressed. However, the components in quadrature to phase vector A are those which are in phase with the average half-pump phase vector of FIGURE 3 and are therefore amplified. Thus, the purposeful phase deviation introduced by oscillator 33 causes a signal component to appear in the output of phase detector 14.

The dither signal component appearing in the output of the system is representative of carrier amplitude as is readily discernible from further examination of FIGURE 4. With oscillator 33 disabled, for example, there is no component in quadrature to vector A. However, with the average carrier phase-deviated by the dither signal to the extent indicated by vector A′, the component in quadrature to the average phase vector has the magnitude indicated by the vector D. If the strength of the incoming carrier, and thus the resultant of signal and idler, is reduced by half, as indicated by the vector $A/2$, the signal component in quadrature to the average carrier phase likewise is reduced by half as indicated by the vector $D/2$. Accordingly, that component which has the proper phase to be amplified by the system has a magnitude which is proportional to the amplitude of the incoming carrier amplitude.

The amplified dither signal component is derived from the output of phase detector 14 by way of transformer 34 and filter 35 which has a passband appropriate to the frequency of the signal energy from oscillator 33. The signal energy passed by filter 35 is fed to linear detector 36 in the output of which a unidirectional control signal appears with an amplitude representative of the magnitude of vectors D in FIGURE 4. Consequently, this unidirectional control signal is a function of incoming carrier signal amplitude. The control signal may be utilized as indicated for automatic gain control purposes, as for automatically controlling the gain of IF amplifier 13 or of other amplifiers to which the signal output through capacitor 16 may be coupled. Similarly, the control signal from detector 36 may be fed directly to an amplitude indicator or monitor 37.

An electron beam parametric amplifier, such as quadrupole amplifier 10, contributes uniquely to the operation of the phase lock receiver herein described, because in this system there is no carrier present at the output of the parametric amplifier. The output signal appears only when the incoming signal is phase modulated, when the phase modulation is applied as by way of modulator 33, or when the phase-locked loop is not completely balanced so that a residual direct current is produced at the output of phase detector 14.

The operation of phase detector 14 under the just described conditions differs in certain respects from the usual phase detector encountered in phase-locked systems which do not employ an electron beam parametric amplifier. In such systems, a carrier is always present in the output even under equilibrium conditions; the input signal to the phase detector must be precisely in quadrature with respect to the reference signal to obtain a zero detector output level. Limiting is frequently employed in such systems and may be inherent in the phase detector process; detectors which operate on the basis of duty cycle require an input signal at all times and develop an output signal which is a smooth function of the phase angle of the input to the reference signal. Typical of the duty cycle detector is that described by R. Adler in an article entitled, "The Gated Beam Detector," which appeared in Electronics, volume 22, page 82, for February 1950.

Double diode phase detectors, on the other hand, utilize vector addition of the input and reference signals. A typical double diode phase detector is disclosed in "Television Engineering Handbook," by Donald G. Fink, published by McGraw-Hill in 1957; this detector is described at pages 13–37 and 13–38 and is illustrated in FIGURE 13–33. It is inherently balanced and is usually, though not necessarily, preceded by a limiter. Its output remains at a zero level not only when an input signal is present and in quadrature phase to the reference signal but also when no input signal is present. This latter condition is not necessarily true for a duty cycle type phase detector, although an attempt is frequently made to imitate the characteristics of the balanced double diode phase detector.

For the electron beam parametric amplifier phase locked receiver, the double diode detector is preferable. The duty cycle type phase detector is not preferred and may not even be suitable if its characteristics at zero input signal levels are not stable and well defined. Thus, when phase detector 14 is of the described double diode type, the input signal level from quadrupole amplifier 10 is reduced to zero under balanced conditions. Any phase rotation of the input signal, however, results in the appearance of a component at the output of phase-sensitive detector 14 which produces a positive or negative direct current output voltage corresponding to the direction of phase rotation or drift of the input signal. Hence, the combination of phase-sensitive detector 14 and the electron beam parametric amplifier uniquely permits positive locking of the system upon the input signal average phase to maintain synchronous operation of the parametric amplifier and to respond directly to any tendency to depart from equilibrium conditions.

In addition, it has been shown that the invention in another aspect includes means for reconstituting a control signal indicative of carrier amplitude in a system in which the amplification process suppresses the signal carrier. Also included within the scope of the invention is an apparatus technique for obtaining the synchronous pump signal while avoiding the development in the system of a local signal at the incoming signal frequency. This particular concept is of utility to various apparatus which include a synchronously pumped parametric amplifier. For example, in moving target indicator radar systems incorporating synchronously pumped parametric amplifiers it is similarly desirable to develop the pump signal from locally available signal sources. In one such system, first and second local signal sources (often termed the stalo and coho sources) develop signals of frequencies which may be combined directly to produce a pump signal having a frequency which is twice the input signal frequency. In that system the present arrangement of first doubling the two different local source signals and then combining them to develop the desired synchronous pump signal is advantageous for the same reason of avoiding the production in the system of a local signal which has the same frequency as the desired input signal.

While a particular embodiment of the present invention has been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. A phase-locked wave-signal receiver comprising: a synchronously-pumped parametric amplifier in which wave signal components in quadrature to the half-pump phase are suppressed and signal components in phase with the half-pump phase are amplified; means for maintaining the average phase of a received wave signal in quadrature to the half-pump phase; means for introducing indicating signal energy, having a frequency within the intelligence signal passband of said amplifier, into the amplifying channel of said parametric amplifier to phase-modulate the amplified signal; and amplitude-sensitive means coupled to the output of said amplifier and responsive to said indicating signal energy for developing a control signal indicative of the amplitude of the carrier of said wave signal.

2. A phase-locked wave-signal receiver comprising: a synchronously-pumped parametric amplifier in which wave signal components in quadrature to the half-pump phase are suppressed and signal components in phase with the half-pump phase are amplified; means for maintaining the average phase of a received wave signal in quadrature to the half-pump phase; means for phase-modulating said parametric amplifier with indicating signal energy having a frequency within the intelligence signal passband of said amplifier; and amplitude-sensitive means coupled to the output of said amplifier and responsive to said indicating signal energy for developing a control signal indicative of the amplitude of the carrier of said wave signal.

3. A phase-locked wave-signal receiver comprising: a synchronously-pumped parametric amplifier in which wave signal components in quadrature to the half-pump phase are suppressed and signal components in phase with the half-pump phase are amplified; means for maintaining the average phase of a received wave signal in quadrature to the half-pump phase; means for phase-modulating the pump signal applied to said parametric amplifier with indicating signal energy having a frequency within the intelligence signal passband of said amplifier; and amplitude-sensitive means coupled to the output of said amplifier and responsive to said indicating signal energy for developing a control signal indicative of the amplitude of the carrier of said wave signal.

4. A phase-locked wave-signal receiver comprising: a synchronously-pumped parametric amplifier in which wave signal components in quadrature to the half-pump phase are suppressed and signal components in phase with the half-pump phase are amplified; means for maintaining the average phase of a received wave signal in quadrature to the half-pump phase; means for introducing indicating signal energy, having a frequency outside the range of received intelligence signal components but within the intelligence signal passband of the amplifying channel of said parametric amplifier, into said channel to phase-modulate the amplified signal; and amplitude-sensitive means coupled to the output of said amplifier and responsive to said indicating signal energy for developing a control signal indicative of the amplitude of the carrier of said wave signal.

5. Apparatus for receiving a wave signal having a carrier phase-modulated with intelligence and of predetermined nominal frequency comprising: a wave-signal channel having a predetermined intelligence signal passband, and including a parametric amplifier responsive to said wave signal and phase-sensitive means coupled to said amplifier, for detecting said intelligence while suppressing said carrier and for developing a signal indicative of said carrier drift in the average phase of said wave signal; means for developing and supplying to said amplifier a pump signal having a frequency twice said predetermined nominal frequency; means responsive to said drift-indicative signal for maintaining the half-pump phase of said pump signal constant with respect to the average phase of said wave signal; means for developing indicating-signal energy having a frequency within said passband; means for phase modulating the wave-signal energy in said channel with said indicating-signal energy; and amplitude sensitive means coupled to said channel and responsive to said indicating-signal energy for developing a control signal indicative of the amplitude of said carrier.

6. Apparatus for receiving a wave signal having a carrier phase-modulated with intelligence and of predetermined nominal frequency comprising: a wave-signal channel having a predetermined intelligence signal passband, and including a parametric amplifier responsive to said wave signal and phase-sensitive means coupled to said amplifier, for detecting said intelligence while suppressing said carrier and for developing a signal indicative of drift in the average phase of said wave signal; means for developing and supplying to said amplifier a pump signal having a frequency twice said predetermined nominal frequency; means responsive to said drift-indicative signal for maintaining the half-pump phase of said pump signal constant with respect to the average phase of said wave signal; means for developing indicating-signal energy having a frequency within said passband; means for phase modulating said pump signal with said indicating-signal energy; and amplitude sensitive means coupled to said channel and responsive to said indicating-signal energy for developing a control signal indicative of the amplitude of said carrier.

7. Apparatus for receiving a wave signal having a carrier phase-modulated with intelligence and of predetermined frequency comprising: phase-sensitive receiving means, including a parametric amplifier having a predetermined intelligence signal passband and responsive to said wave signal, for detecting said intelligence while suppressing said carrier; a signal source productive of indicating signal energy at a frequency within said passband; means for impressing said indicating signal energy upon said receiving means; amplitude-sensitive means coupled to said receiving means and responsive to said indicating signal energy for developing a control signal indicative of the amplitude of said carrier; first and second signal sources having frequencies algebraically additive to a frequency substantially equal to said predetermined frequency; means for doubling the frequency of signals from said first source; means for doubling the frequency of signals from said second source; means for combining said doubled signals to develop a pump signal for said amplifier having a frequency twice said predetermined frequency; and means for applying said pump signal to said amplifier.

8. In apparatus for receiving intelligence-bearing wave signals of predetermined frequency, an amplifier system comprising: a parametric amplifier responsive to said wave signals; first and second sources of signals having individual frequencies algebraically additive to a frequency substantially equal said predetermined frequency; means for multiplying the frequency of signals from said first source; means for multiplying the frequency of signals from said second source; means for combining said multiplied signals to develop a pump signal for said amplifier having a frequency twice that of said predetermined frequency; and means for applying said pump signal to said amplifier.

9. In apparatus for receiving intelligence bearing wave signals of predetermined frequency, an amplifier system comprising: a parametric amplifier responsive to said wave signals; first and second sources of signals having individual frequencies algebraically additive to a frequency substantially equal to said predetermined frequency; means for doubling the frequency of signals from said first source; means for doubling the frequency of signals from said second source; means for combining said doubled signals to develop a pump signal for said amplifier having a frequency twice that of said predetermined frequency; and means for applying said pump signal to said amplifier.

10. In apparatus for receiving intelligence bearing wave signals of predetermined frequency, an amplifier system comprising: a parametric amplifier responsive to said wave signals; means, including a first signal source, responsive to amplified signals from said amplifier for transposing said wave signals to an intermediate frequency; means, including a second signal source, responsive to said intermediate frequency signals for detecting said intelligence; means for doubling the frequency of signals from said first source; means for doubling the frequency of signals from said second source; means for combining said doubled signals to develop a pump signal for said amplifier having a frequency twice that of said predetermined frequency; and means for applying said pump signal to said amplifier.

11. In apparatus for receiving wave signals having a carrier phase-modulated with intelligence and of predetermined nominal frequency, an amplifying system comprising: phase-sensitive receiving means having a predetermined intelligence signal passband and responsive to said wave signals for detecting said intelligence while suppressing said carrier; a signal source productive of indicating signal energy at a frequency within said passband; means for impressing said indicating signal energy upon said receiving means; and amplitude-sensitive means coupled to the output of said receiving means and responsive to said indicating signal energy for developing a control signal indicative of the amplitude of said carrier.

12. In apparatus for receiving wave signals having a carrier phase-modulated with intelligence and of predetermined nominal frequency, an amplifying system comprising: phase-sensitive receiving means having a predetermined intelligence signal passband and responsive to said wave signals for detecting said intelligence while suppressing said carrier; a local oscillator productive of signal energy at a frequency within said passband; means for impressing said oscillator signal energy upon said receiving means; amplitude-sensitive means coupled to the output of said receiving means and responsive to said oscillator signal energy for developing a control signal indicative of the amplitude of said carrier.

13. In apparatus for receiving wave signals having a carrier phase-modulated with intelligence and of predetermined nominal frequency, an amplifying system comprising: phase-sensitive receiving means having a predetermined intelligence signal passband and responsive to said wave signals for detecting said intelligence while suppressing said carrier; a signal source productive of indicating signal energy at a frequency within said passband; means for phase-modulating said wave-signals with said indicating signal energy; and amplitude-sensitive means coupled to said receiving means and responsive to said indicating signal energy for developing a control signal indicative of the amplitude of said carrier.

14. In apparatus for receiving wave signals having a carrier phase-modulated with intelligence and of predetermined nominal frequency, an amplifying system comprising: phase-sensitive receiving means, including a parametric amplifier having a predetermined intelligence signal passband and responsive to said wave signals, for detecting said intelligence while suppressing said carrier; a source of pump signals coupled to said parametric amplifier; a signal source productive of indicating signal energy at a frequency within said passband; means for phase-modulating said pump signal with said indicating signal energy; and amplitude-sensitive means coupled to said receiving means and responsive to said indicating signal energy for developing a control signal indicative of the amplitude of said carrier.

15. In apparatus for receiving a wave signal having a carrier phase-modulated with intelligence and of predetermined frequency comprising: a wave-signal channel having a predetermined intelligence signal passband, and including an electron-beam parametric amplifier responsive to said wave signal and phase-sensitive means coupled to said amplifier, for detecting said intelligence while suppressing said carrier and for developing a direct current signal the polarity of which represents the direction of drift in the average phase of said wave-signal; means for developing and supplying to said amplifier a pump signal having a frequency twice said predetermined frequency; and means responsive to said direct current signal for maintaining the half-pump phase of said pump signal constant with respect to the average phase of said wave signal.

16. In apparatus for receiving a wave signal having a carrier phase-modulated with intelligence and of predetermined frequency comprising: a wave-signal channel having a predetermined intelligence signal passband, and including a parametric amplifier responsive to said wave signal and phase-sensitive means coupled to said amplifier, for detecting said intelligence while suppressing said carrier and for developing a signal indicative of drift in the average phase of said wave signal; means for developing and supplying to said amplifier a pump signal having a frequency twice said predetermined frequency; and means responsive to said drift-indicative signal for maintaining the half-pump phase of said pump signal constant with respect to the average phase of said wave signal.

17. A phase-locked wave-signal receiver comprising: an electron-beam parametric amplifier which when synchronously pumped suppresses wave-signal components in quadrature to the half-pump phase and amplifies signal components in phase with the half-pump phase; a phase-sensitive detector coupled to said amplifier and responsive to the amplified wave signal for developing a direct current signal the polarity of which represents the direction of drift in the average phase of said wave signal; means for developing and supplying to said amplifier a pump signal having a frequency substantially twice that of the wave-signal carrier; and means responsive to said direct-current signal for maintaining the average phase of said wave signal in quadrature to the half-pump phase.

References Cited in the file of this patent

UNITED STATES PATENTS 2,969,459 Hern ---------------- Jan. 24, 1961